INVENTORS
W. GERALD JAMES &
JOHN C. MOULD
BY Hurvitz & Rose
ATTORNEYS

INVENTORS
W. GERALD JAMES &
JOHN C. MOULD
BY Hurvitz & Rose
ATTORNEYS

United States Patent Office 3,448,446
Patented June 3, 1969

3,448,446

MULTIPLE CHANNEL DIGITAL READOUT SYSTEM

Wilbur Gerald James, Falls Church, and John C. Mould, McLean, Va., assignors to Melpar, Inc., Falls Church, Va., a corporation of Delaware Filed Oct. 22, 1965, Ser. No. 501,457
Int. Cl. H03k *13/24;* H04l *3/00*
U.S. Cl. 340—347 8 Claims

ABSTRACT OF THE DISCLOSURE

A digital representation of the amplitudes of low-level analog signals carried by respective ones of a plurality of input channels is provided by amplifying the signals in their respective channels, sampling the input channels in sequence for multiplexing the respective signals to an analog-to-digital converter, and supplying the digital outputs to readout devices in synchronism with the sampling of the channels. Signal isolation as well as variable gain amplification for a wide range of input signal levels and frequencies (down to almost DC) is provided in each channel by a pair of high input impedance DC electrometer amplifier stages coupled in cascaded relationship via an R-C coupling network having a time constant equal to at least five times the period of the lowest frequency of the input signals to the respective overall amplifier.

The present invention relates generally to apparatus for providing a digital readout of multiple low level analog voltages. More particularly, the invention relates to apparatus for sequentially measuring the peak amplitude of signals in a plurality of conductive paths with a wide dynamic range and with an extremely high sensitivity and for providing a digital presentation of the peak amplitude of the signals.

It is common to provide systems which will produce digital readouts of the levels of analog signals deriving from multiple input channels on a multiplexed basis. Typically, the several channels are sequentially sampled in some predetermined order and the samples applied to a single output channel including a suitable amplifier and analog-to-digital converter. Where the analog input signals are of a low level type and slowly varying time, special precautions are necessary to provide an accurate readout and to prevent any deleterious loading effect on input signal by the measuring apparatus. In such cases the measuring apparatus must be of relatively high input impedance to provide the necessary isolation between input and output and must be extremely stable and of high sensitivity. Moreover, the amplifier must be responsive in rapid fashion to the voltage level differences which are presented at its input terminals as each channel is sequentially connected to the single output channel.

One conventional method for providing the multi-channel low level measurements is to apply each of the input signals, which may be derived from suitable sensing elements capable of converting the physical parameter under observation to a proportional analog voltage, to a separate storage element, such as a capacitor, in each channel. The storage element is then alternately connected to sample the input signal of its respective channel and to the output channel by operation of a sequential switch such as a commutator. In this manner input and output are isolated from one another as the several input channels are connected one at a time in sequence to the output channel. It is, of course, still necessary to prevent faulty readings which might occur through loading, e.g. partially discharging of the capacitors prior to measurement or during measurement. Thus, the amplifier to which the capacitor voltages are applied is preferably of extremely high input impedance and each capacitor of low leakage type. For measurement of DC voltages or voltages of extremely low frequency, it has been proposed to provide a DC amplifier in the single output channel but this presents a severe problem in obtaining accurate measurements because of inherent drift in such amplifiers, especially where the amplifier is of high gain. Chopper stabilized DC amplifiers have been suggested and used but are relatively expensive and introduce additional problems of synchronization.

It is therefore a primary object of the present invention to provide apparatus for the peak measurement and digital presentation of multi-channel low level slowly varying electrical analog signals.

It is another object of the present invention to provide a system for presenting a digital readout of multiple low level analog voltages which may be derived from a single channel input or from multiple input channels sequentially connected to a single output channel.

Briefly, the present invention comprises a system wherein a plurality of input channels, each of which carries an electrical analog voltage derived from an appropriate sensor or transducer, are cyclically and sequentially coupled to a single intermediate channel which includes an analog-to-digital converter. The digital format constituting the output of the converter is preferably applied to respective ones of a plurality of readout devices which are sequentially connected to the converter output in synchronism with the application of respective ones of the signals carried by the input channels to the input of the converter. The time interval during which each input channel is sampled may be selected by the equipment operator. The apparatus according to the invention will read the maximum voltage amplitude and will hold this reading until the same channel is again sampled. In order to provide the desired wide dynamic range and extremely high sensitivity, and, in addition, to provide drift-free operation, each input channel is provided with a novel automatc gain changing operational amplifier. In essence, each amplifier includes two DC electrometer amplifiers with R-C interstage coupling. The output of the overall amplifier is sensed by suitable level detectors defining preset limits and if the amplifier output should fall outside these limits the gain is changed to return the output level to the desired range. The second amplifier stage includes a DC restorer to compensate for base line shift due to the capacitive coupling between stages. The amplifier circuit is essentially drift free and will respond to extremely slowly varying frequencies, approaching DC.

Accordingly it is a further object of the present invention to provide a multiple channel peak reading digital readout system for low level slowly varying electrical signals wherein said system utilizes improved amplifying devices.

The above and still further objects, features and attendant advantages of the present invention will become apparent from a consideration of the following detailed description of one particular embodiment thereof, especially when taken in conjunction with the accompanying drawings, in which.

Figure 1:
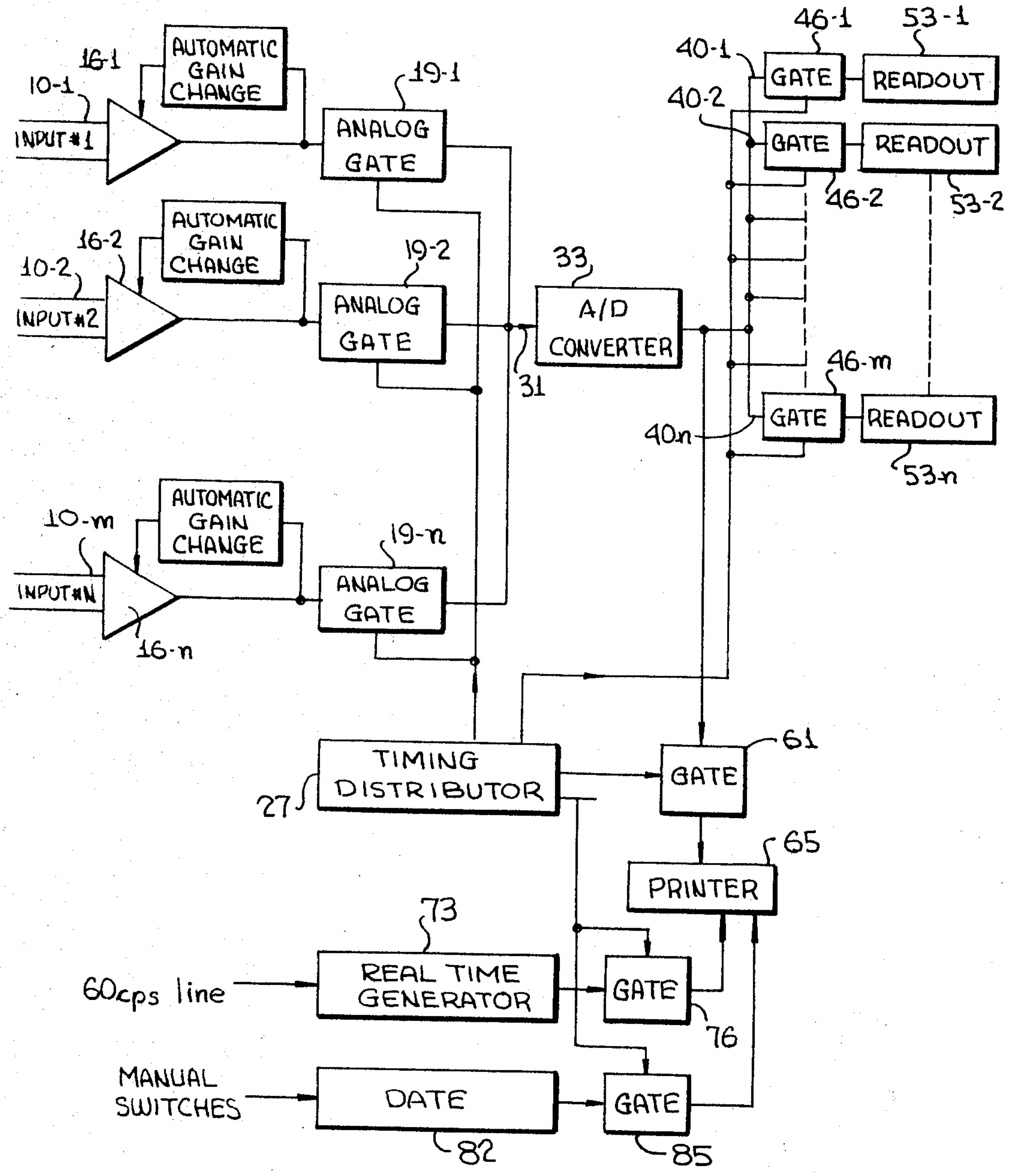
FIGURE 1 is a block diagram of an exemplary system in accordance with the present invention.
Figure 2:
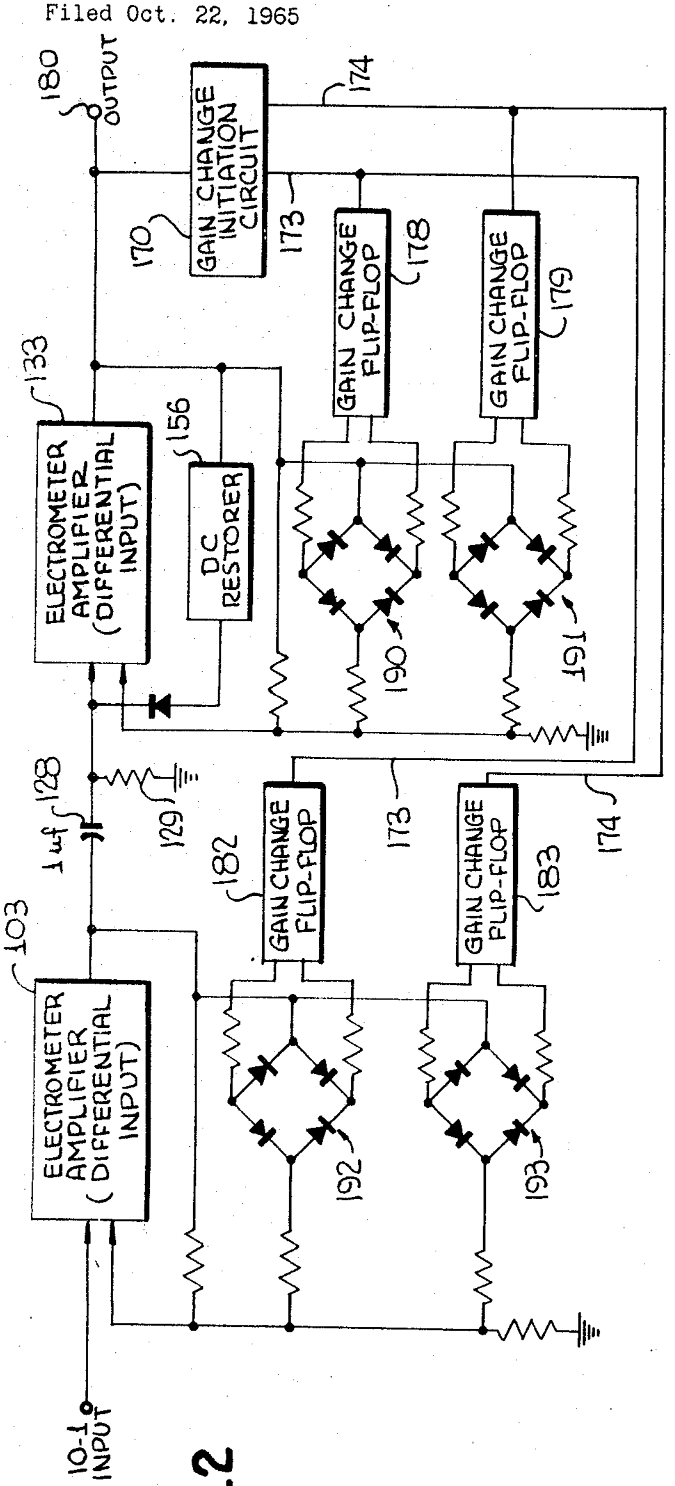
FIGURE 2 is a circuit diagram of the amplifier employed in each input channel of the system of FIGURE 1.

Referring specifically to FIGURE 1, the system includes a plurality of input channels **10–1, 10–2 . . . 10–*n*. Each input signal carried by the several input channels may be an electrical analog voltage derived from a transducer which senses, for example, the time rate of change of a physical variable and provides an output voltage proportional thereto. In a practical embodiment the system has been employed as a readout system for gas chromatographs but it will readily be recognized that it may be employed to provide a digital readout presentation for mass spectrometers or other high impedance sources, or as a peak reading digital voltmeter. Each input channel is connected to the input terminals of a respective automatic gain changing operational amplifier 16–1, 16–2 . . . 16–***n*. Each amplifier, an exemplary embodiment of which will be discussed in the description of FIGURE 2, is of high sensitivity and provides a substantially drift-free output, and is so arranged as to respond to frequencies down to less than 0.01 cycle per second, for practical purposes D-C.

After processing by the amplifiers, each analog signal is gated in sequential fashion to a single intermediate channel 31 for conversion to a serial digital format by analog-to-digital converter 33. To this end the output signal deriving from each amplifier is applied to a respective one of a plurality of analog gates 19–1, 19–2 . . . 19–*n*, each of which may simply be a conventional high impedance-open circuit, low impedance-closed circuit switch whose contacts are closed to gate the respectively associated signal to the single intermediate channel 31 in response to the operation of a timing distributor 27. The latter may comprise a commutator or stepping switch controlled by a suitable timer.

Timing distributor 27 also supplies pulses to logical gate circuits 46–1, 46–2 . . . 46–*n* to synchronize the passage of the proper data from the digital data stream provided by *A/D* converter 33 to readout devices 53–1, 53–2 . . . 53–*n* with the sampled input channel respectively associated with those readout devices. The readout devices may be of any conventional design, such as electronic counters, and may be located at one or more remote receiving stations. While a single conductive path is shown from timing distributor 27 to each of analog gates and logical AND gates of the respective input and output channels it will be understood that this is merely for purposes of convenience and clarity and that in general a separate path will be provided to each gate circuit.

A suitable printer 65 may be employed, if desired, to which the serial digital data is applied from *A/D* converter 33 through gate 61, the latter being controlled by appropriate pulses from timing distributor 27. For recording time of day and date information adjacent the data recorded from each input channel on printer 65, a real time generator 73 and date generator 82 controlled respectively from a 60 c.p.s. line and from manual switches may be provided, the respective outputs of these generators being gated to the printer via gates 76 and 85 under the control of pulses from timing distributor 27. Timing distributor 27 may include conventional controls to permit the operator of the apparatus to select the timing points $t_n$ indicated on the input level versus time chart of FIGURE 3.

Figure 3:
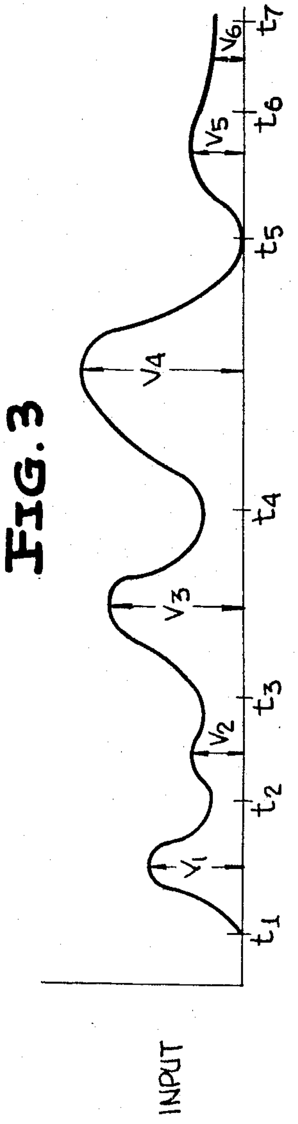
FIGURE 3 is a composite waveform illustrating the voltages to be measured as they occur serially in time.

Referring now to FIGURE 3, the waveform is indicated as being of a composite nature, with that portion in the time interval from $t_1$ to $t_2$ being the voltage level of the analog signal present in channel 10–1, that portion from $t_2$ to $t_3$ being the varying voltage level carried by channel 10–2, and so forth. It will be understood, however, that the waveform shown in FIGURE 3 may also be derived from a single input channel which alone is sampled to provide analog samples of peak voltage amplitude in the designated time intervals. In such a case, a single input channel-single output channel system would be employed corresponding to one input channel, the *A/D* conversion intermediate channel and one output channel of the system of FIGURE 1.

Referring now to FIGURE 2, there is shown an illustrative embodiment of the operational amplifier and associated apparatus used in each input channel of the system of FIGURE 1. For purposes of clarity the amplifier is shown as deriving an input from channel 10–1 but it will be understood that the amplifier circuitry in each channel is identical to that shown.

The operational amplifier comprises a pair of differential input electrometer amplifiers 103, 133 of any conventional type, preferably electrostatically shielded to reduce leakage and surface currents to a minimum. Electrometer amplifiers are characterized by high input impedance and capability of amplifying extremely low level currents. Like all direct current amplifiers, however, the conventional electrometer amplifier is subject to drift. As previously mentioned, this would normally preclude its use in the multi-channel digital readout system of FIGURE 1. In order to provide means for amplifying the low level substantially unidirectional signal contemplated by the present invention in a virtually drift-free manner, with high sensitivity and wide dynamic range, the circuit of FIGURE 2 is employed.

Electrometer amplifier 103 drives an R-C coupling network comprising series capacitor 128 and shunt resistor 129 in the conductive path between the two electrometer amplifiers 103 and 133. The R-C coupling network is arranged to have a long time constant, approximately fifteen minutes with the illustrative component values indicated in the figure, to prevent very slow drifts from displacing the amplifier (i.e, overall operational amplifier) baseline output from zero value, and also to permit setting the system output voltage to zero at calibration, despite any residual errors which may occur from the balancing out of detector static currents during the initial sampling interval for each channel. In practice, the R-C coupling network may have a time constant equal to at least five times the period of the lowest signal frequency to be measured. We have found that by using two electrometer amplifiers with such AC coupling, the amplifier circuit is essentially drift free and will respond to frequencies less than 0.01 cycle per second. Thus, for a lower frequency response limit of 0.01 c.p.s. corresponding to a period of 100 seconds, the time constant of the R-C coupling network should be on the order of $5\times100=500$ seconds, or greater, to provide the desired drift-free operation. In addition, because of the high impedance characteristics of electrometer amplifiers, the source impedance may be as high as $10^{14}$ ohms without loading down of the input signals by the readout system. Coupling capacitor 128 preferably comprises Teflon dielectric with a leakage resistance greater than $10^{12}$ ohms. A DC restorer circuit 156, of conventional type, is provided at the second electrometer stage 133 to compensate for base line shift due to the capacitive coupling between the two stages.

In many applications of the present invention it may be necessary or desirable to provide circuitry for changing overall amplifier gain. A convenient manner of accomplishing this objective and to provide a linear rather than logarithmic output is shown in FIGURE 2. When overall amplifier output (at terminal 180) approaches within a predetermined value, say one-half volt, of saturation or zero voltage, gain change initiation circuit 170, which may comprise a pair of conventional one-shot multivibrators set to respond to voltages of the respective predetermined limits, generates a series of pulses on either of lines 173 or 174, depending respectively on the limit reached. The pulses are fed through a diode logic network to respective pairs of buffered gain changing flip-flops 178, 179 and 182, 183 associated with each of electrometer amplifiers 133, 130. The buffer outputs are employed to appropriately switch diode quad gates 190, 191, 192, 193 to provide different values of feedback resistance for the respective amplifiers and thus to change amplifier gain to the desired range. It is important to note that carefully matched diodes are required in the quad gates to prevent the insertion of an offset voltage into the amplifier input.

In the amplifier network shown in FIGURE 2, the gain changing circuitry will permit changing overall amplifier gain through a range of three decades, although this is purely illustrative and a greater or lesser number of ranges may be provided, as desired. The disclosed amplifier network, when employed in the multi-channel digital readout system of FIGURE 1, provides significant improvement over prior art low-level multiplexing systems. In addition to the advantages previously mentioned, we have found that the present system readily measures peak input signal amplitudes on the order of $10^{-14}$ amperes and can be provided with a dynamic range, through the automatic gain changing, of $10^6$ to 1.

While we have described a specific embodiment of our invention it will be apparent that various modifications in the particular details of construction illustrated and described may be resorted to without departing from the spirit and scope of the invention, as defined by the appended claims.

We claim:

1. A system for providing a digital presentation representative of amplitudes of low-level analog input signals carried by a multiple channel input circuit, each of the input channels including amplifier means responsive to the respective input signal for amplification thereof; an analog-to-digital converter; switch means for sequentially sampling the amplified signals in each input channel and for sequentially applying the sampled signals to said converter, and means coupled to the output circuit of said converter operating in synchronism with said sequential sampling means for providing a visual presentation of the digitized values of amplitude of said sampled signals; said amplifier means each including a pair of high input impedance direct current electrometer amplifier stages, a series capacitance-shunt resistance network coupling said pair of electrometer amplifier stages, said resistance-capacitance coupling network having a time constant equal to at least five times the period of the lowest frequency of the input signals to said amplifier means, and means for restoring the D-C level shift produced by the resistance-capacitance coupling network.

2. The combination according to claim 1 including means coupled to the output of said amplifier means for varying the gain of said amplifier means in response to the level of the respective input signal varying outside predetermined maximum and minimum limits.

3. A low-level, low-frequency signal amplifier for providing high input impedance drift free amplification, comprising a pair of D-C electrometer amplifiers each having input terminals and output terminals, and an R-C network coupling the output terminals of one of said amplifiers to the input terminals of the other of said amplifiers, said R-C network comprising at least one capacitive element in series with said electrometer amplifiers and at least one resistive element connected to said capacitive element and to a point of reference potential, said R-C network having a time constant at least five times as great as the period of the lowest frequency signal to be amplified.

4. The combination according to claim 3 wherein said signal amplifier further includes means for varying the gain thereof in response to variations of input signal level outside a predetermined range of levels.

5. A multiple channel analog-to-digital conversion system comprising means in each channel for amplifying low level, low frequency input signals applied thereto; each of said amplifying means including at least two direct current electrometer amplifiers, capacitance means series coupling said amplifiers, and resistance means coupling said capacitance means to a point of reference potential, to provide an R-C coupling network between said amplifiers, said R-C coupling network having a long time constant relative to the period of the lowest frequency of input signal to be amplified; a single analog-to-digital converter; and means for multiplexing the amplified signals in each channel to said analog-to-digital converter, whereby to provide a serial digital output format representative of the information conveyed by the signals carried by the individual input channels.

6. The combination according to claim 5 wherein said R-C coupling network has a time constant equal to at least five times the period of said lowest frequency signal.

7. The combination according to claim 5 including means coupled to the electrometer amplifier of said amplifying means following said R-C network for restoring the D-C level at the input of the last-named amplifier to eliminate the D-C level shift caused by the capacitive coupling between said amplifiers.

8. The combination according to claim 7 further including means for varying the gain of said amplifying means in response to output signal levels outside a predetermined range.

References Cited

UNITED STATES PATENTS

| | | | |
|---|---|---|---|
| 3,187,265 | 6/1965 | Hermes | 330—2 |
| 3,234,545 | 2/1966 | James et al. | 340—347 |
| 3,281,676 | 10/1966 | Liu | 330—2 |
| 3,314,062 | 4/1967 | Pommerening | 340—347 |
| 3,351,867 | 11/1967 | Javernik et al. | 330—183 |

FOREIGN PATENTS

| | | |
|---|---|---|
| 218,219 | 3/158 | Australia. |

MAYNARD R. WILBUR, *Primary Examiner.*

J. GLASSMAN, *Assistant Examiner.*

U.S. Cl. X.R.

324—109; 330—180